(12) United States Patent
Rumreich

(10) Patent No.: US 9,118,969 B2
(45) Date of Patent: Aug. 25, 2015

(54) METHODS FOR DISTRIBUTING CONTENT IN MULTI-ROOM ENVIRONMENT

(75) Inventor: Mark Francis Rumreich, Indianapolis, IN (US)

(73) Assignee: Thomson Licensing, Issy Les Moulineaux (FR)

( * ) Notice: Subject to any disclaimer, the term of this patent is extended or adjusted under 35 U.S.C. 154(b) by 0 days.

(21) Appl. No.: 14/378,772

(22) PCT Filed: Feb. 21, 2012

(86) PCT No.: PCT/US2012/025866
§ 371 (c)(1),
(2), (4) Date: Aug. 14, 2014

(87) PCT Pub. No.: WO2013/126041
PCT Pub. Date: Aug. 29, 2013

(65) Prior Publication Data
US 2014/0373077 A1   Dec. 18, 2014

(51) Int. Cl.
| | |
|---|---|
| *H04N 7/18* | (2006.01) |
| *H04N 21/472* | (2011.01) |
| *H04N 21/433* | (2011.01) |
| *H04N 21/436* | (2011.01) |
| *H04N 21/488* | (2011.01) |

(52) U.S. Cl.
CPC ....... *H04N 21/47217* (2013.01); *H04N 21/433* (2013.01); *H04N 21/436* (2013.01); *H04N 21/4333* (2013.01); *H04N 21/43615* (2013.01); *H04N 21/4882* (2013.01)

(58) Field of Classification Search
CPC .......... H04N 21/47217; H04N 21/433; H04N 21/436; H04N 21/4325; H04N 21/4333; H04N 21/43615; H04N 21/4882

USPC ................................ 725/78, 80, 82, 114, 141
See application file for complete search history.

(56) References Cited

U.S. PATENT DOCUMENTS 8,613,028 B2 * 12/2013 Dodd .............................. 725/78
2005/0097623 A1   5/2005 Tecot et al.
(Continued)

FOREIGN PATENT DOCUMENTS

| EP | 1513262 | 9/2005 |
|---|---|---|
| EP | 2341715 | 7/2011 |
| KR | 20100009900 | 1/2010 |

OTHER PUBLICATIONS

Search Report mailed Aug. 12, 2013.

*Primary Examiner* — Mulugeta Mengesha
(74) *Attorney, Agent, or Firm* — Robert D. Shedd; Reitseng Lin

(57) ABSTRACT

A method enables a user to pause or stop content reproduction in one viewing room, and resume content reproduction in another viewing room according to a timing condition. According to an exemplary embodiment, the method is used in a system including first and second video devices, and includes steps of: receiving by the first video device while playing back a program, a first control signal to interrupt the playback; enabling display of a message by the second video device for a predetermined time interval asking a viewer whether to continue playback of the program by the second video device; receiving by the second video device a second control signal within the predetermined time interval to continue playback of the program; and enabling playback of the program by the second video device in response to the second control signal.

20 Claims, 4 Drawing Sheets

(56) References Cited

U.S. PATENT DOCUMENTS

| | | |
|---|---|---|
| 2005/0252959 A1 | 11/2005 | Gaumond et al. |
| 2006/0010480 A1 | 1/2006 | Gaumond et al. |
| 2008/0066137 A1 | 3/2008 | Cox et al. |
| 2009/0232481 A1 | 9/2009 | Baalbergen et al. |
| 2009/0241149 A1* | 9/2009 | Yoshioka et al. ............... 725/87 |
| 2010/0171765 A1 | 7/2010 | Kim et al. |
| 2011/0200304 A1 | 8/2011 | Rutledge |

* cited by examiner

METHODS FOR DISTRIBUTING CONTENT IN MULTI-ROOM ENVIRONMENT

This application claims the benefit, under 35 U.S.C. §365 of International Application PCT/US2012/025866 filed Feb. 21, 2012 which was published in accordance with PCT Article 21(2) on Aug. 29, 2013 in English.

BACKGROUND OF THE INVENTION

1. Field of the Invention

The present invention generally relates to methods for distributing content including audio and video content in a multi-room environment, and more particularly, to methods for enabling a user to pause or stop content reproduction in one viewing room, and resume content reproduction in another viewing room according to a timing condition.

2. Background Information

The distribution of audio and/or video content in a multi-room environment (e.g., residential and/or business dwelling) is a desirable aspect of consumer electronic products. Current devices, such as digital video recorders (DVRs), for example, allow for the sharing of recorded content throughout a household of video devices (e.g., set-top-boxes, television sets, etc.). With such devices, a user can pause or stop content in one room and resume viewing in another room. However, one significant problem with current devices in such a process is that many steps are required to resume the desired content.

For example, certain current devices require that the paused content be explicitly recorded on a first video device, then that the content (e.g., program) be located via navigation in a recorded programs list on a second device, and then further, that the desired scene be located via fast forwarding. The performance of each and every one of these steps with such current devices can be particularly inconvenient and time-consuming for users.

Accordingly, there is a need in the art to address the foregoing issues and thereby provide improved methods for distributing content including audio and video content in a multi-room environment according to a timing condition. The present invention described herein addresses these and/or other issues.

SUMMARY OF THE INVENTION

In accordance with an aspect of the present invention, a method for use in a system comprising first and second video devices is disclosed. According to an exemplary embodiment, the method comprises steps of: receiving by the first video device while playing back a program, a first control signal to interrupt the playback; enabling display of a message by the second video device for a predetermined time interval asking a viewer whether to continue playback of the program by the second video device; receiving by the second video device a second control signal within the predetermined time interval to continue playback of the program; and enabling playback by the second video device the program in response to the second control signal.

In accordance with another aspect of the present invention, a method for use in a video server serving first and second video devices is disclosed. According to an exemplary embodiment, the method comprises steps of: receiving a first signal from the first video device indicating interruption of playing back a program; determining if the second video device is turned on in response to receiving the first signal; and if the second video device is turned on, instructing the second video device to display a message for a predetermined time interval asking a viewer whether to continue playing back the program by the second video device.

In accordance with yet another aspect of the present invention, another method is disclosed. According to an exemplary embodiment, the method comprises steps of: receiving, via a first video device, a user input to interrupt reproduction of a program by the first video device; in response to the user input, causing, via the first video device, the second video device to enable display of a message for a predetermined time interval asking a viewer whether to continue reproduction of the program by the second video device; and wherein: if the second video device receives a user input to continue reproduction of the program within the predetermined time interval, the second video device enables reproduction of the program.

In accordance with still yet another aspect of the present invention, a video device is disclosed. According to an exemplary embodiment, the video device comprises means, such as an input/output, for receiving signals from, and transmitting signals to, a second video device; means, such as a processor, for receiving a user input to interrupt reproduction of a program by the video device, and in response to the user input, cause the second video device to enable display of a message for a predetermined time interval asking a viewer whether to continue reproduction of the program by the second video device; and wherein: if the second video device receives a user input to continue reproduction of the program within the predetermined time interval, the second video device enables reproduction of the program.

In accordance with still yet another aspect of the invention, a video device is disclosed. According to an exemplary embodiment, the video device comprises an input/output operative to receive signals from, and transmit signals to a second video device; and a processor operative to receive a signal from the second video device for displaying a message for a predetermined time interval asking a viewer whether to continue reproduction of a program interrupted by said second video device, and in response to a user input to continue reproduction of said program within said predetermined time interval, enable reproduction of said program.

The aforementioned summaries of preferred and exemplary embodiments of the present invention are merely illustrative of the inventive concepts presented herein, and are not intended to limit the scope of the present invention in any manner.

BRIEF DESCRIPTION OF THE DRAWINGS

The above-mentioned and other features and advantages of this invention, and the manner of attaining them, will become more apparent and the invention will be better understood by reference to the following description of exemplary embodiments of the invention taken in conjunction with the accompanying drawings, wherein.

The exemplifications set out herein illustrate preferred embodiments of the invention, and such exemplifications are not to be construed as limiting the scope of the invention in any manner.

DESCRIPTION OF THE PREFERRED EMBODIMENTS

Figure 1:
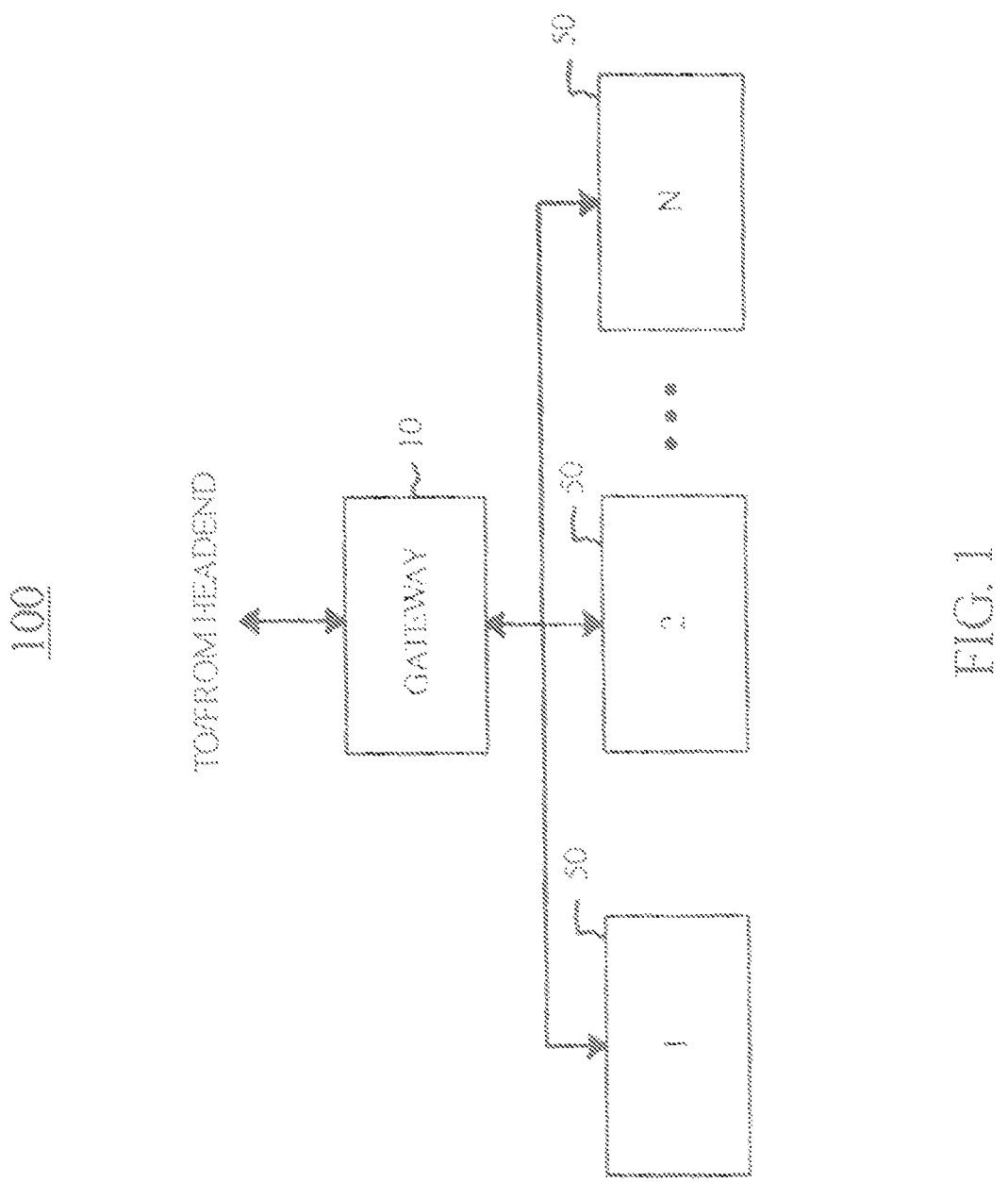
FIG. 1 shows a block diagram of a content distribution system according to an exemplary embodiment of the present invention.

Referring now to the drawings, and more particularly to FIG. 1, a content distribution system 100 according to an exemplary embodiment of the present invention is shown. As shown in FIG. 1, content distribution system 100 comprises a gateway device 10 and a plurality (N) of user stations 50. According to an exemplary embodiment, gateway device 10 is operatively coupled in a bi-directional manner to a system head-end (e.g., terrestrial, cable, satellite broadcaster, another server, etc.), and distributes content signals (e.g., audio, video, data) received from the system head-end to the plurality of user stations 50.

Gateway device 10 and user stations 50 in FIG. 1 may, for example, represent a digital video network implemented in a residential and/or business dwelling, in which gateway device 10 operates as a video server for user stations 50. Bi-directional communication among devices is provided within this network as indicated by the directional arrows shown in FIG. 1. Such communication may, for example, be in accordance with a protocol, such as the Universal Plug and Play (UPnP) protocol, the Multimedia over Coax Alliance (MoCA) protocol and/or other protocol.

According to an exemplary embodiment, gateway device 10 or one of the user stations 50 in FIG. 1 includes a digital video recorder (DVR) that is operative to store user-selected content received and distributed by gateway device 10. For purposes of example and explanation, however, the present invention will be described herein in accordance with exemplary embodiments in which a digital video recorder (DVR) is included in one of the user stations 50. The DVR can also be an independent unit connected to the network and separated from the user stations 50 but shared by the user stations 50 and the gateway device 10 through the network.

According to an exemplary embodiment, each individual user station 50 in FIG. 1 is operative to receive and output (i.e., visually and/or aurally) content provided by gateway device 10, as well as any content provided by another user station 50 (e.g., the one having the DVR). The particular user station 50 having the DVR is operative to store content locally at that user station 50, and distribute such stored content to other user stations 50 for output. According to an exemplary embodiment, a given user station 50 may, for example, include a digital set-top box (DSTB) having an associated display device or monitor. Alternatively, a given user station 50 may, for example, include an audio/video receiver having an integrated display device (e.g., television set, etc.). Further exemplary details regarding an individual user station 50 of FIG. 1 will be provided later herein with reference to FIG. 2.

Content distribution system 100 of FIG. 1 is exemplary only, and the principles of the present invention described herein may be applied to and implemented in other systems having different types of configurations than the exemplary one shown in FIG. 1.

According to principles of the present invention, and as will be described later herein, a user can pause or stop content reproduction at one user station 50 (e.g., in one viewing room) of FIG. 1, and resume content reproduction at another user station 50 (e.g., in another viewing room) according to a timing condition. According to an exemplary embodiment, a timer is initiated at a device on the network in response to a user input that pauses or stops content reproduction at a first user station 50. If a device at a second user station 50 on the network is already turned on, or is turned on within a predetermined time interval after the user input (or some other timing condition), a display device associated with the second user station 50 automatically displays a message allowing a user to resume reproduction, at the second user station 50, of the content that was previously paused or stopped at the first user station 50.

Figure 2:
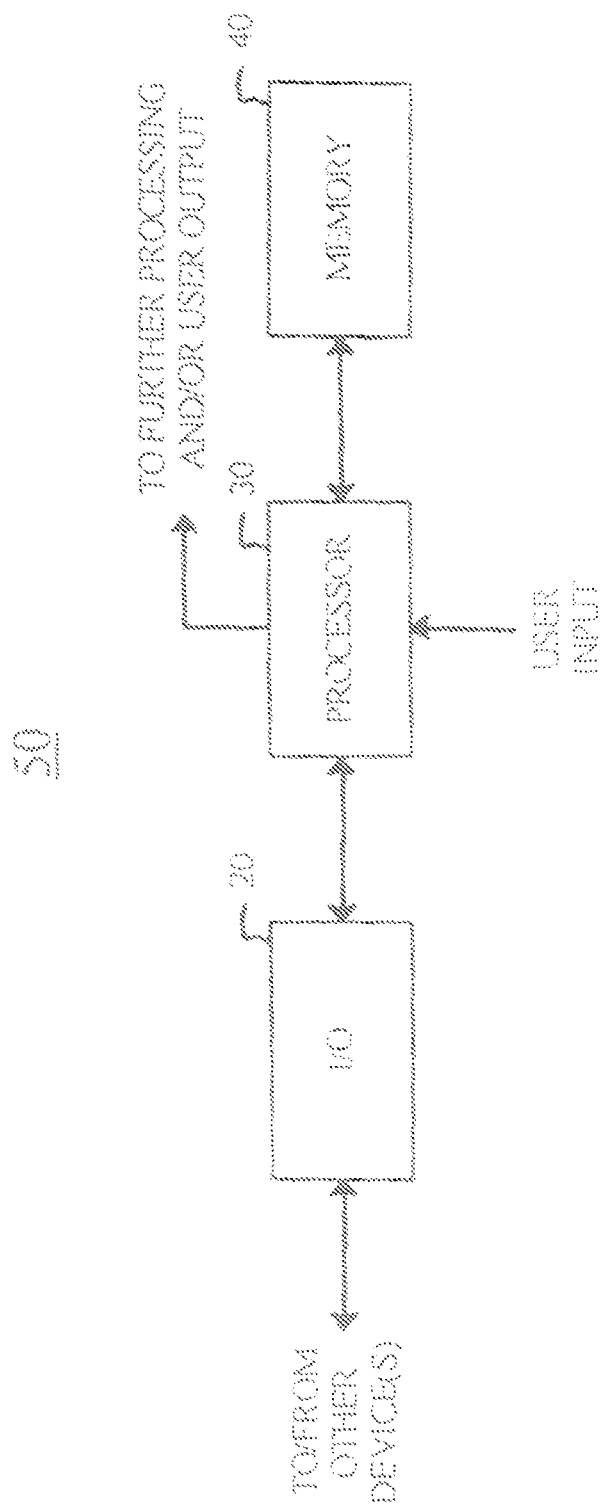
FIG. 2 shows a block diagram of relevant portions of an individual user station of FIG. 1 according to an exemplary embodiment of the present invention.

FIG. 2 shows a block diagram of relevant portions of an individual user station 50 of FIG. 1 according to an exemplary embodiment of the present invention. According to an exemplary embodiment, a given user station 50 comprises apparatus including input/output (I/O) means such as I/O block 20, processing means such as processor 30, and memory means such as memory 40. Such apparatus may, for example, be included in a digital set-top box (DSTB), or an audio/video receiver having an integrated display device (e.g., television set, etc.). For clarity of description, certain conventional elements associated with user station 50 such as certain control signals, power signals and/or other elements may not be shown in FIG. 2.

I/O block 20 is operative to perform I/O functions of user station 50. According to an exemplary embodiment, I/O block 20 is operative to receive signals such as audio, video and/or data signals in analog and/or digital format from gateway device 10 and other user stations 50. I/O block 20 is also operative to output signals to gateway device 10 and devices at other user stations 50 (see FIG. 1).

Processor 30 is operative to perform various signal processing and control functions of user station 50. According to an exemplary embodiment, processor 30 processes the audio, video and/or data signals provided from I/O block 20 by performing functions including tuning, demodulation, forward error correction, and transport processing functions to thereby generate digital data representing audio, video and/or data content. The digital data produced from such processing functions may be provided for further processing and/or user output (e.g., display and/or audio output).

Processor 30 is also operative to execute software code that facilitates and enables performance of the various embodiments and methods of the present invention described herein. Further details regarding these aspects of the present invention will be provided later herein. Processor 30 is also operative to perform and/or enable other functions of user station 50 including, but not limited to, processing user inputs made via user input device(s), administering one or more timers, enabling on-screen displays, reading and writing data from and to memory 40, and/or other operations. Processor 30 may be embodied using one or more integrated circuits (ICs).

Memory 40 is operatively coupled to processor 30 and performs data storage functions of user station 50. Depending on implementation, at least a portion of memory 40 may be included on the same IC(s) as processor 30. According to an exemplary embodiment, memory 40 stores data including, but not limited to, software code, on-screen display (e.g., menu) data, user selection/setup data, and/or other data. For the given user station 50 of FIG. 1 that includes digital video recorder (DVR) functionality, memory 40 also includes a hard disk drive (HDD) operative to store and distribute content in a selective manner responsive to user inputs.

Figure 3:
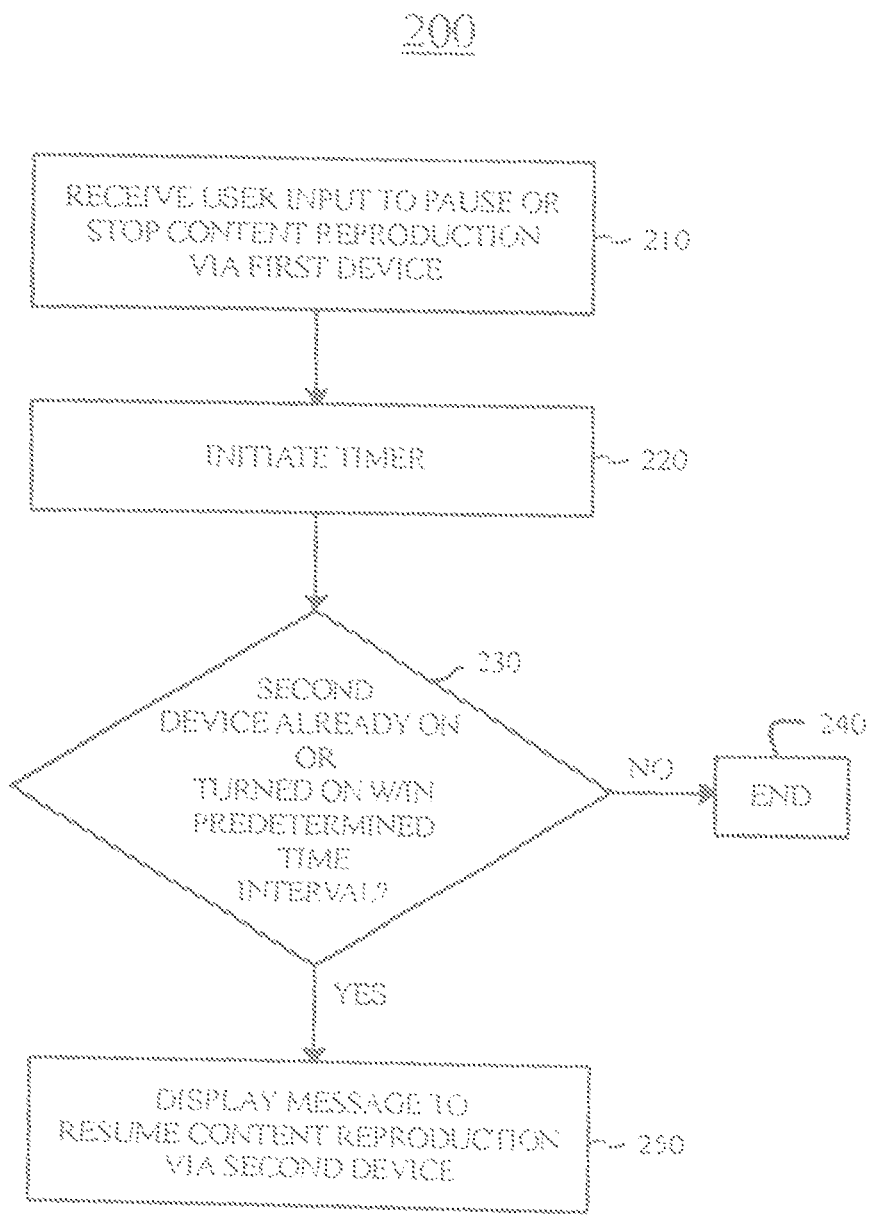
FIG. 3 shows a flowchart illustrating steps according to an exemplary embodiment of the present invention.

Referring to FIG. 3, a flowchart 200 illustrating steps according to an exemplary embodiment of the present invention is shown. For purposes of example and explanation only, the steps of FIG. 3 may be explained hereinafter with specific reference to the exemplary embodiments of FIGS. 1 and 2 described above. However, it should be intuitive to those skilled in the art that the inventive principles embodied in the flowchart of FIG. 3 may also be applied to other embodiments and/or implementations. Moreover, the steps of FIG. 3 are exemplary only, and are not intended to limit the present invention in any manner.

At step 210, a user input is received via a first device (first user station 50) on the network (see FIG. 1) to pause or stop content (e.g., audio data, video data, etc.) currently being reproduced via the first device and/or another device (user station) on the network. According to an exemplary embodiment, a user at a particular user station 50 provides an input to the first device to pause or stop content reproduction at step 210 via a remote control device or other input mechanism, and such input is received and processed by processor 30 as a control signal (see FIG. 2). As referred to herein, stopping or interrupting content reproduction at step 210 may include simply turning off the first device.

At step 220, a timer is initiated in response to the user input of step 210. According to an exemplary embodiment, processor 30 of the particular user station 50 that receives the user input at step 210 initiates the timer at step 220 in response to the user input. However, according to an alternative embodiment, the timer may be initiated at step 220 (and subsequently administered) by gateway device 10, or by a device at a user station 50 other than the one that received the user input at step 210. In such a case, the user input provided at step 210 would be detected by the other device via the network (see FIG. 1).

In an embodiment, each user station 50 is assigned an identification (ID) number by a user, representing the room number. When a user station 50 receives the user input to stop or pause content reproduction, the user station 50 sends the following information to other user stations 50 through the network, so that other user stations 50 can start the timer: its ID number and the identification, such as title, of the content (program) that is paused or stopped.

In yet another embodiment, the gateway 10 can serve as a server, and initiation and interruption of a playback (reproduction) of a program must be approved by the gateway 10. In this embodiment, the user station 50, which receives the user input to interrupt the reproduction should inform the gateway 10 and the gateway 10 can start the timer.

At step 230, a determination is made as to whether a second device on the network is already turned on, or is turned on within a predetermined time interval. According to an exemplary embodiment, the determination is made at step 230 by the same processor 30 that initiated the timer at step 220, and such determination is made in response to the initiation of such timer. Also according to an exemplary embodiment, the predetermined time interval used at step 230 begins when the timer is initiated at step 220. If a second device on the network is not already turned on when the predetermined time interval begins, the processor 30 administering the timer continues to monitor the network for the predetermined time interval at step 230 to detect if, and/or when, a second device on the network is turned on. The predetermined time interval utilized at step 230 may be set by a user, for example, during a set-up process of the particular device, and/or adjusted thereafter.

If the gateway 10 is the server, the gateway may poll the status of each user station 50.

If the determination at step 230 is negative, process flow advances to step 240 where the method ends and no message for resuming reproduction of the content paused or stopped at step 210 is displayed via a second device on the network. In such a case, it is presumed that the user does not want to resume reproduction of the content paused or stopped at step 210.

Alternatively, if the determination at step 230 is positive, process flow advances to step 250 where a message to resume reproduction of the content paused or stopped at step 210 is displayed via the second device on the network that is already turned on when the predetermined time interval begins, or that is turned on before the predetermined time interval elapses. According to an exemplary embodiment, if more than one second device on the network is already turned on, or is turned on within the predetermined time interval at step 230, the message to resume reproduction of the content paused or stopped at step 210 is displayed by each of these second devices at step 250.

If the gateway 50 is the server, the gateway 50 should request all user stations that are turned on to display the message for a user to resume reproduction. The gateway 50 in this embodiment should provide information necessary for a user station 50 to display the message.

Figure 4:
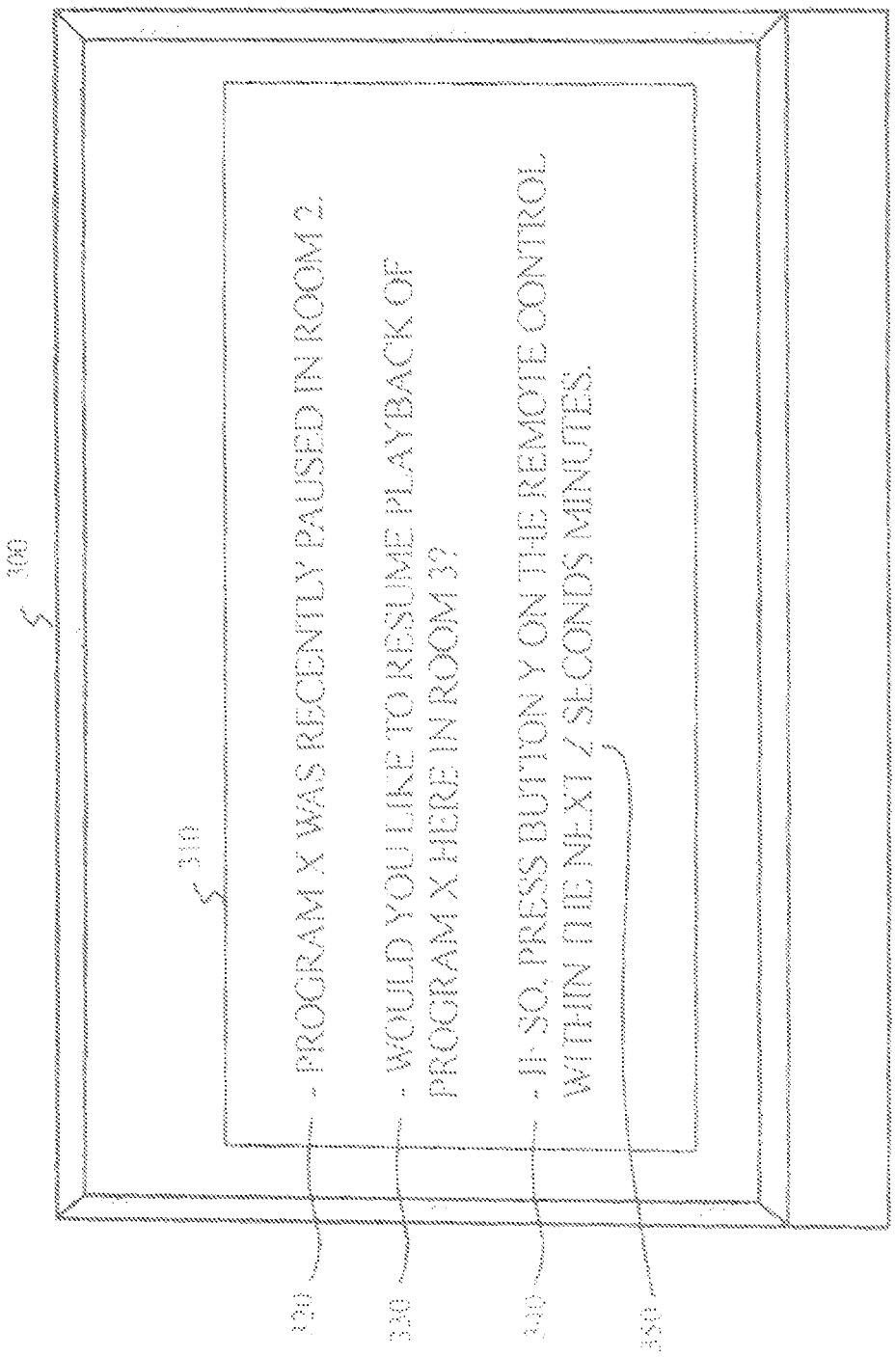
FIG. 4 shows a user interface display according to an exemplary embodiment of the present invention.

FIG. 4 shows a user interface display according to an exemplary embodiment of the present invention that may be used at step 250 to display the aforementioned message. The user interface display of FIG. 4 is exemplary only, and other types of displays including different formats and/or types of information may also be used in accordance with the principles of the present invention.

As shown in FIG. 4, a display device 300 (which may, for example, be operatively coupled to processor 30 of FIG. 2) provides an on-screen menu 310 listing multiple items of information labeled as 320, 330 and 340. Item 320 indicates that a given program (e.g., program X) was recently paused (or stopped) in a given room (e.g., room 2). Item 330 asks the user if he or she would like to resume playback/reproduction of the given program in the present room (e.g., room 3). Item 340 provides the user with instructions regarding how to resume playback/reproduction of the given program in the present room (e.g., press button Y on a remote control device before the predetermined time interval elapses).

According to an exemplary embodiment, item 340 also includes an indication of how much time is left in the predetermined time interval discussed above. This time indication (e.g., Z minutes and/or seconds) is labeled as item 350 in FIG. 4. In this manner, the time indication of item 350 displays a count down process for the user in real-time as the predetermined time interval elapses. Also according to an exemplary embodiment, the period of time in which on-screen menu 310 is displayed at step 250 may vary depending on when a particular second device is turned on. For example, if a given second device on the network is not initially turned on at step 230, but is later turned on within a particular time interval that is smaller than the predetermined time interval, on-screen menu 310 is displayed at step 250 for a time interval equal to a difference between the predetermined time interval and the particular time interval.

According to an exemplary embodiment, a user may respond to on-screen menu 310 at step 250 to thereby resume reproduction of the content that was paused or stopped at step 210 via the second device. As indicated in FIG. 4, for example, a user may respond to on-screen menu 310 by pressing a given button (e.g., button Y) on a remote control device before the predetermined time interval elapses. Such action may, for example, cause a user control signal to be provided to processor 30 of the second device. In response to this user control signal, processor 30 enables reproduction of the content that was paused or stopped at step 210 via the second device.

According to an exemplary embodiment, processor 30 of the second device causes on-screen menu 310 to be removed from the associated display device 300 in response to the aforementioned user control signal at step 250. Also, if on-screen menu 310 is displayed by more than one of the second devices in the network (which occurs if more than one second device on the network is already turned on, or is turned on within the predetermined time interval at step 230), once one of the second devices responds to on-screen menu 310 to resume content reproduction, on-screen menu 310 is removed from display device(s) 300 of the other second device(s) in the network (e.g., in response to a network control signal provided from processor 30 at the second device that responded first). Alternatively, if a user does not properly respond to on-screen menu 310 before the predetermined time interval elapses, processor 30 of the second device also causes on-screen menu 310 to be removed from the associated display device 300 at step 250.

Assuming the user properly responds to on-screen menu 310 at step 250, content reproduction may be resumed via the second device in various different ways. For example, if the program whose reproduction is being resumed is a recorded program (e.g., recorded on a DVR at another device), content reproduction/playback is resumed at the second device at the same position in the recorded program where playback by the first device was interrupted. This type of content reproduction/playback may be coordinated, for example, by network control signals between processors 30 of the first and second devices (and possibly another device on the network including the DVR). As another example, if the program whose reproduction is being resumed is a broadcast program from a particular channel, content reproduction/playback is resumed at the second device by the second device tuning the particular channel. This type of content reproduction/playback may be coordinated, for example, by network control signals between processors 30 of the first and second devices, and gateway device 10.

As described above, the present invention provides, among other things, a method for enabling a user to pause or stop content reproduction in one viewing room, and resume content reproduction in another viewing room according to a timing condition. While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A method for use in a system comprising first and second video devices, said method comprising:
   receiving by said first video device while playing back a program, a first control signal to interrupt said playback;
   checking, for a predetermined time, whether said second video device is turned on;
   if said second video device is turned on within a particular time interval smaller than said predetermined time interval, enabling display of a message by said second video device asking a viewer whether to continue playback of said program by said second video device;
   receiving by said second video device a second control signal within said predetermined time interval to continue playback of said program;
   enabling playback by said second video device said program in response to said second control signal; and
   if said second video device is not turned on within said predetermined time interval, skipping said message display enabling and said playback enabling by said second video device.

2. The method of claim 1, further comprising enabling removal of said display of said message responsive to said second control signal receiving.

3. The method of claim 1, further comprising if said second control signal is not received within said predetermined time interval, enabling removal of said display of said message.

4. The method of claim 1, wherein said program is a recorded program and said playback enabling enables said second video device to playback said recorded program from a position in said recorded program where playback by said first video device was interrupted.

5. The method of claim 1, wherein said program is a broadcast program from a channel and said playback enabling enables said second video device to tune to said channel for displaying a broadcast program from said channel.

6. The method of claim 1, wherein if said second video device is turned on within said particular time interval, said message display enabling enables display of said message for a time interval equals to a difference between said predetermined time interval and said particular time interval.

7. The method of claim 1, wherein said predetermined time interval is user adjustable.

8. The method of claim 1, wherein if more than one said second video device exists, once one said second video device responds, the display message is removed from other video devices.

9. A method for use in a video server serving first and second video devices, said method comprising:
   receiving a first signal from said first video device indicating interruption of playing back a program;
   determining, for a predetermined time, if said second video device is turned on in response to receiving said first signal; and
   if said second video device is turned on, within a particular time interval smaller than said predetermined time interval, instructing said second video device to display a message asking a viewer whether to continue playing back said program by said second video device; and
   if said second video device is not turned on within said predetermined time interval, skipping said instructing to said second video device to display the message.

10. A method, comprising:
    receiving, via a first video device, a user input to interrupt reproduction of a program by said first video device;
    in response to said user input, causing, via said first video device, said second video device to enable display of a message asking a viewer whether to continue reproduction of said program by said second video device; and
    wherein:
    if said second video device is turned on within a particular time interval smaller than said predetermined time interval, enables display of said message for a time interval equals to a difference between said predetermined time interval and said particular time interval, and if said second video device does not receive a second user input to continue reproduction of said program within said predetermined time interval, said second video device does not enable reproduction of said program.

11. The method of claim 10, wherein if said second video device receives said user input to continue reproduction of said program within said predetermined time interval, said second video device enables reproduction of said program.

12. The method of claim 10, wherein said first device includes a digital video recorder (DVR).

13. The method of claim 10, wherein said predetermined time interval is user adjustable.

14. A video device, comprising:
an input/output operative to receive signals from, and transmit signals to, a second video device;
a processor operative to receive a user input to interrupt reproduction of a program by said video device, and in response to said user input, check, for a predetermined time, whether said second video device is turned on; if said second video device is turned on within a particular time interval smaller than said predetermined time interval, cause said second video device to enable display of a message for a time interval equals to a difference between said predetermined time interval and said particular time interval asking a viewer whether to continue reproduction of said program by said second video device; and wherein:
if said second video device receives a second user input to continue reproduction of said program within said predetermined time interval, said second video device enables reproduction of said program, wherein if said second video device does not receive said second user input to continue reproduction of said program within said predetermined time interval, said second video device does not enable reproduction of said program.

15. The video device of claim 14, further comprising a digital video recorder (DVR) for storing said program.

16. The video device of claim 14, wherein said predetermined time interval is user adjustable.

17. A video device, comprising:
means for receiving signals from, and transmitting signals to, a second video device;
means for receiving a user input to interrupt reproduction of a program by said video device, and in response to said user input, checking, for a predetermined time, whether said second video device is turned on; if said second video device is turned on within a particular time interval smaller than said predetermined time interval, causing said second video device to enable display of a message for a time interval equals to a difference between said predetermined time interval and said particular time interval asking a viewer whether to continue reproduction of said program by said second video device; and wherein:
if said second video device receives a second user input to continue reproduction of said program within said predetermined time interval, said second video device enables reproduction of said program, wherein if said second video device does not receive said second user input to continue reproduction of said program within said predetermined time interval, said second video device does not enable reproduction of said program.

18. The video device of claim 17, further comprising means for digitally storing said program.

19. The video device of claim 17, wherein said predetermined time interval is user adjustable.

20. A video device, comprising:
an input/output operative to receive signals from, and transmit signals to a second video device;
a processor operative to receive a signal from said second video device for displaying a message asking a viewer whether to continue reproduction of a program interrupted by said second video device, wherein if said video device is turned on within a particular time interval smaller than said predetermined time interval, said processor is operative to enable display of said message for a time interval equals to a difference between said predetermined time interval and said particular time interval and in response to a user input to continue reproduction of said program within said predetermined time interval, said processor is operative to enable reproduction of said program; and wherein
wherein if said video device does not receive said user input to continue reproduction of said program within said predetermined time interval, said processor does not enable reproduction of said program.

* * * * *